United States Patent Office

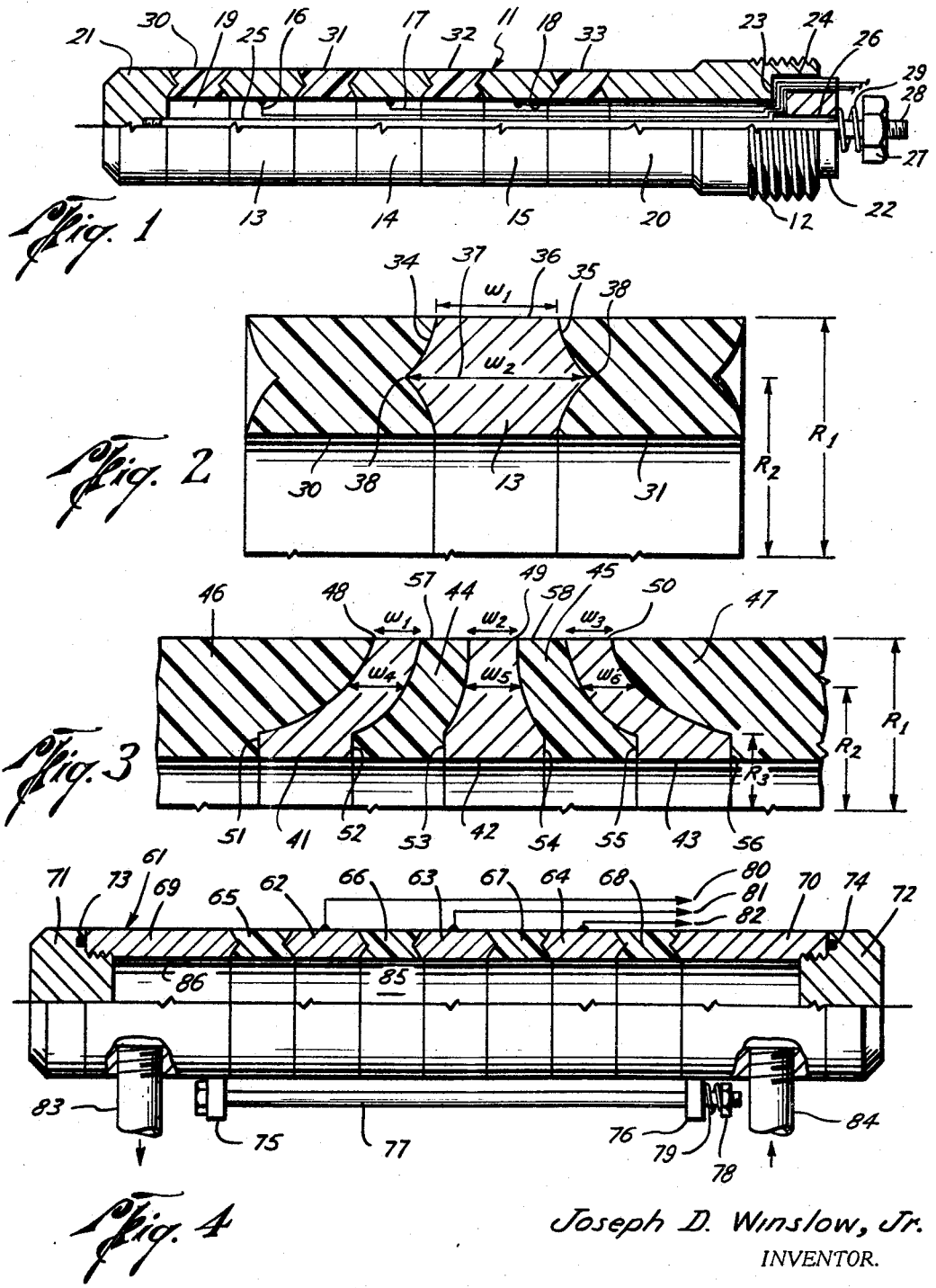

3,491,012
Patented Jan. 20, 1970

3,491,012
CORROSION TEST PROBE ASSEMBLY
Joseph D. Winslow, Jr., Houston, Tex., assignor to Petrolite Corporation, St. Louis, Mo., a corporation of Delaware
Filed July 22, 1968, Ser. No. 746,509
Int. Cl. B01h 3/02; G01n 27/00, 27/30
U.S. Cl. 204—195          12 Claims

ABSTRACT OF THE DISCLOSURE

A corrosion test probe assembly including an elongated test body supporting a plurality of spaced-apart metallic electrodes with cylindrical surfaces exposed to a corrosive liquid. Electrical conductors are connected to the electrodes. Spacers insulate the electrodes from each other. The spacers and electrodes are arranged on the test body in fluid-tightness. The electrodes have a structural configuration such that exposed surfaces of constant areas are maintained even after the electrodes are refinished to remove pitting. The electrodes may have the same identical cylindrical surface areas at several diameters. The insulating spacers, by similar structural configuration, may also have the identical exposed surface areas. Thus, identical electrical characteristics of the electrodes and spacers are maintained in the probe through subsequent refinishing operations. Determination of corrosion rates with such probe assembly will not require recalibration of the measuring facilities after each refinishing operation.

BACKGROUND OF THE INVENTION

Field of the invention

This invention relates to measuring and testing of corrosion processes, and it relates more particularly to the instruments and electro-chemical techniques used in the study of corrosion processes.

Description of the prior art

It is often desired to determine the rates at which metals corrode within a corrosive liquid. For example, corrosion inhibitors are added to aqueous liquids to reduce the corrosion of exposed metals. Instruments are used to measure the rates at which these metals corrode so that the effectiveness of the inhibitor can be determined. The measurement of the rate of corrosion upon metals usually involves an instrument associated with a probe which carries a plurality of electrodes immersed within the corrosive liquid. Probes have been lowered into oil wells to study downhole corrosion effects, to evaluate inhibitors, and even to determine production variables which influence the rate of corrosion on exposed metals. Probes have also been used to monitor the rate of corrosion of metals containing water floods that are employed to stimulate oil production from subterranean reservoirs.

The probes usually employ a plurality of electrodes which are insulated from one another. Generally the electrodes are metals. The electrodes in the corrosive liquid undergo certain electro-chemical changes that are related to rates of corrosion of specific metals. Thus, the rate of corrosion can be correlated with the electro-chemical effects upon the metallic electrodes of a probe immersed in the corrosive liquid.

An electro-chemical process and apparatus especially useful in measuring corrosion rates is described in application Ser. No. 332,399 which was filed Dec. 23, 1963, now U.S. Patent No. 3,406,101. In this technique, there is employed a corrosion rate meter which includes a probe having three electrodes adapted to be exposed to a corrosive liquid, an adjustable current source, an ammeter and a high impedance volt meter as primary components. The adjustable current source applies a small electric current between a "test" electrode and an "auxiliary" electrode. At the same time, the volt meter monitors the polarization potential between the "test" electrode and a "reference" electrode. The current flow slightly polarizes the surface of the "test" electrode, and as a result, causes a shift in the potential between the "test" and "reference" electrodes. The current flow required to produce 10 millivolts polarization is directly proportional to the corrosion rate of the "test" electrode undergoing corrosion.

If the corrosion rate is low, a very small current flow will polarize the "test" electrode. If the corrosion rate is high, much more current flow is required to polarize the electrode. The weight of metal loss from the electrode (by electro-chemical corrosion) is directly proportional to the current flow in accordance with Faraday's Law. Thus, by use of appropriate constants and adjustment of the exposed surface area of the "test" electrode, the ammeter can be calibrated directly into any desired units of corrosion rate providing the surface area of the "test" electrode is kept constant.

Obviously, the initial surface area of the electrode exposed to the corrosive liquid can be adjusted into the desired range. In order to provide symmetry of the probe, and for other reasons, the exposed surface areas of all electrodes are made identical. Thus, if the electrodes are constructed of the same material, such as 1020 mild steel, any of the electrodes may serve as the "auxiliary," "test" and "reference" type electrode in electro-chemical techniques for determining the rate of corrosion.

Although the probe can be manufactured with certain exposed surface areas of the electrodes, the corrosive liquid causes the exposed surfaces to become pitted and otherwise damaged. Eventually, the probe must be either discarded, or the electro-chemical technique recalibrated for the new characteristics which the electrodes have assumed. Usually the latter occurrence is avoided by substituting a new probe. The probe can be refinished to provide a clean, fresh surface on the electrodes exposed to the corrosive liquid. However, the probe now will have a different exposed surface area than for which the probe was originally calibrated. Thus, a recalibration is required to maintain the ammeter of the corrosion meter calibrated directly in units of the corrosion rate.

It is the purpose of this invention to provide a corrosion test probe assembly in which the probe can be refinished whereby the electrodes have fresh surfaces exposed to the corrosive liquid and no change occurs in their surface areas. Thus, the corrosion meter used with the probe assembly maintains its calibration directly in the units of the corrosion rate for which it was originally calibrated.

SUMMARY OF THE INVENTION

In accordance with this invention, there is provided a corrosion test probe assembly for determining the corrosion rate of a metallic material in an electrolyte by means of polarization measurement. The assembly comprises an elongated test body on which are supported a plurality of spaced apart electrodes. Each electrode has an exposed corrodible surface. The electrodes are connectable to a corrosion meter by electrical conductive means. Spacers insulate the electrodes from one another. The electrodes have a structural configuration such that each electrode maintains an exposed corrodible surface of constant area after a portion of the exposed surface is removed during refinishing.

BRIEF DESCRIPTION OF THE DRAWINGS

FIGURE 1 is a prospective view, partially in cross-section, of the probe assembly of this invention;

FIGURE 2 is an enlargement in cross-section of the central electrode and adjacent spaces shown in FIGURE 1;

FIGURE 3 is a cross-section similar in view to FIGURE 2 but of electrodes and spacers of another embodiment of the probe assembly of this invention; and FIGURE 4 is a prospective view, partially in cross-section, of a probe assembly of yet another embodiment of this invention.

DESCRIPTION OF SPECIFIC EMBODIMENTS

In FIGURE 1, there is illustrated a corrosion test probe assembly having an elongated test body 11 which can be secured by threaded shank 12 within a system carrying a corrosive liquid. A plurality of spaced-apart electrodes 13, 14 and 15 are supported upon the body 11. Electrical conductors 16, 17 and 18 connect to the electrodes 13, 14 and 15, respectively, and pass outwardly through a central opening 19 within the body 11 through its base 20. These conductors can interconnect the probe to the corrosion meter with which it is associated. The end cap 21 encloses one end of the opening 19. A ferrule 22 rests concentrically within the base 20 upon a shoulder 23 formed therein. The conductors 16, 17 and 18 pass through ferrule 22 within a passageway 24. A threaded stud 25 is secured at one end to the end cap 21. The stud 25 extends through an axial opening 26 in the ferrule 22. A nut 27 is received upon threads 28 of the stud 25 and compresses helical spring 29 against the ferrule 22. Spacers 30 through 33 insulate the electrodes from each other, the base 20 and end cap 21. Thus, the stud 25 provides an arrangement to tension the base 20, end cap 21, electrodes 13, 14 and 15, and spacers 30–33 into axial alignment and fluid-tight engagement.

The electrodes, where the probe is tubular, have a cross-sectional configuration within a plane containing the longitudinal axis of the body 11 such that each electrode has the same cylindrical surface area at first and second radii. Preferably the electrodes have identical exposed cylindrical surface areas at the first radius whereby their electro-chemical functions are identical and interchangeable.

Referring to FIGURE 2, the structural configuration of the electrode 13 and spacers 30 and 31 will be described relative to an enlarged cross-sectional view. The electrodes 14 and 13 are identical to the electrode 15. The electrode 13 has surfaces 34 and 35 which are arcuate. More particularly, these surfaces, which are perpendicular to the longitudinal axis of the body 11, are so curved that the numerical product of the radius and the longitudinal dimension of each electrode at the radius is a constant for several radii. This structural arrangement of the electrode 13 produces an exposed corrodible surface 36 of constant area irrespective of its particular radial dimension.

More particularly, the electrode 13 has a longitudinal dimension $W_1$ at radius $R_1$ to provide the cylindrical surface 36 of an area suitable for calibrating a corrosion rate meter directly in some common units of corrosion rate. The surfaces 34 and 35 are shaped so that a cylindrical surface 37 represented by longitudinal dimention $W_2$ at radius $R_2$ is of the same magnitude. The shape of the surfaces 34 and 35 may be determined graphically, mathematically, or by any other desired mode so that the surfaces 36 and 37 have the same exposed surface area. The longitudinal dimensions at radii falling between $R_1$ and $R_2$ also provide the same exposed cylindrical surface area as surfaces 36 and 37. Thus, the exposed surface of the electrode 13 can be reduced, as by refinishing, from $R_1$ to $R_2$ and the resultant exposed cylindrical surface has a constant area regardless of the particular dimension of the radii. The terminology constant or same exposed surface area is not intended to be limited to identical magnitude but includes slight magnitude variations which can be tolerated in the associated corrosion meter without requiring recalibration.

The spacers 30–33 not only insulate electrically the electrodes 13, 14 and 15 from each other, but also provide fluid-tight seals. The spacers are constructed of an insulating material such as a plastic. Preferably the fluorine-chlorine based hydrocarbon polymers are employed for constructing the spacers. The polymers available commercially under the trade names Teflon and Kel-F are well suited for this purpose. Other suitable insulating materials may be employed from constructing these spacers if desired.

The electrodes and spacers have complimentary longitudinally extending projections and depressions for aligning and fluidly sealing the electrodes, spacers, end cap 21 and base 20 to one another. More particularly, the electrodes have longitudinally extending concentric projections which reach an apex 38. The spacers have a complementary depression to receive the projection of the electrodes. Similar projections and depressions on the end cap 21 and base 20 provide for aligning and fluidly sealing them to the spacers 30 and 33, respectively.

The exterior surface of the body 11 may be refinished to its original roughness by turning, or any other suitable means, to provide fresh exposed surfaces on the electrodes 13, 14 and 15. A reduction in the diameter of the body 11 does not change the exposed surface areas of the electrodes. Thus, there is no need to recalibrate the corrosion meter into the desired units of corrosion rate each time the probe is refinished.

Another embodiment of the probe of this invention is illustrated in FIGURE 3. Annular electrodes 41, 42 and 43 are separated from one another by insulating spacers 44 and 45. Spacers 46 and 47 facilitate securing the electrodes to suitable end cap and base members on an elongated test body in the same manner as the probe illustrated in FIGURES 1 and 2. The electrodes 41, 42 and 43 have arcuate surfaces which extend from a first radius $R_1$ to radius $R_3$. These arcuate surfaces, perpendicular to the longitudinal axis of the body, are arranged such that the product of the radius and the longitudinal dimension at such radius are a constant for radii between $R_1$ and $R_3$. Therefore, the exposed cylindrical surfaces 48, 49 and 50 of the electrodes maintain a constant area regardless of the dimension of these radii. For example, the electrodes 41, 42 and 43 have cylindrical surfaces 48, 49 and 50 with dimensions $W_1$, $W_2$ and $W_3$, respectively, at radius $R_1$. At radius $R_2$, these electrodes have equal area cylindrical surfaces of longitudinal dimensions $W_4$, $W_5$ and $W_6$, respectively. Thus, the electrodes 41, 42 and 43 have a constant area of exposed cylindrical surfaces irrespective of exact dimension for the several radii between $R_1$ and $R_3$. The arcuate surfaces of the electrodes at radius $R_3$ terminate into concentric nesting surfaces 51 through 56. These nesting surfaces provide a simplified mechanism for aligning the electrodes, spacers, end cap and base to one another. The probe assembly shown in FIGURE 3 can be resurfaced by turning, or otherwise reducing its diameter, to provide fresh corrodible surfaces on the electrodes. The refinishing operation does not change the area of the exposed cylindrical surfaces.

In FIGURE 3, the spacers 44 and 45 can be formed with exterior cylindrical surfaces 57 and 58 equal to surfaces 48, 49 and 50 of the electrodes. Thus, the spacers maintain the same relationship in exposed surface area as the electrodes 41, 42 and 43. In this manner, a fixed relationship between the exposed cylindrical surfaces of the electrodes and spacers is provided in this embodiment of the probe assembly.

In FIGURE 4, another probe assembly embodiment is shown wherein interior cylindrical surfaces of annular electrodes are exposed to the corrosive material. An elongated body 61 supports electrodes 62, 63 and 64. Spacers 65 through 68 separate the electrodes, tubular end members 69 and 70 from one another. End caps 71 and 72 are threadedly secured within tubular members 69 and 70, respectively, and fluidly sealed by O-rings 73 and 74. The tubular members 69 and 70, spacers and electrodes, are secured into axial alignment and fluid-tightness. Flanges 75 and 76 are circumferentially spaced about the tubular members 69 and 70. Bolt 77 passes through the flanges with a nut 78 carried on one threaded end to compress a spring 79 against the flange 76. By this arrangement, the tubular member 69 and 70 are tensioned together. Electrical conductors 80, 81 and 82 are connected to the electrodes 62, 63 and 64 externally of the body 61. Entrance and exit conduits 83 and 84 are provided for circulating fluid through central opening 85 within the body 61.

The electrodes 62, 63, and 64 are arranged with arcuate side surfaces in the same manner as for the embodiments described in FGURES 1 and 2. However, these surfaces are arranged to provide a constant exposed surface area from the interior cylindrical surface 86 of the body 61. Thus, the body 61 can be refinished by removing one of the end covers 63 or 64, and reaming out the interior surface 86. Thus, the electrodes 62, 63 and 64 can be refinished and a fresh exposed corrodible surface is provided. However, this exposed surface maintains a constant area of the same magnitude as when the probe assembly was first placed into service.

The probe assembly has been described as having electrodes with cylindrical exposed surfaces. It will be apparent that these surfaces can be other than cylindrical, and these surfaces will function interchangeably with those presently described.

The electrodes usable in the probe assembly of this invention may be constructed by any suitable conductive material. Preferably, the electrodes are of 1020 mild steel. Although steel has been proved suitable for use as a reference electrode in the present corrosion test probe assembly, the theory of the technique indicates that other materials and metal alloys may be employed. Materials such as iron, aluminum, copper, brass, lead, nickel, titanium, tantalum, zirconium, chromium and alloys thereof may be used under similar conditions. The use of steel is preferred for the electrodes. However, corrosion rates may be determined in a shorter test period at higher temperatures and pressures with the electrodes formed of other materials. Electrodes constructed of the same material are an advantage since all electrodes respond identically to the corrosive liquid in which the corrosion rate test is being performed.

Various modifications and alterations in the described probe assembly will be apparent to those skilled in the art from the foregoing description which do not depart from the spirit of the invention. For this reason, these changes are desired to be included within the scope of the appended claims. The appended claims define the present invention; the foregoing description is to be employed for setting forth the present embodiments as illustrative and not limitative in nature.

What is claimed is:
1. A corrosion test probe assembly suitable for determining the rate of corrosion of a metallic material by means of polarization measurement comprising:
   (a) an elongated test body having a side surface extending between longitudinally spaced apart ends,
   (b) a plurality of spaced-apart electrodes supported in said body, each said electrode having an exposed corrodible surface forming a part of said side surface of said body,
   (c) separate electrical conductive means connected to said electrodes,
   (d) spacer means insulating said electrodes from each other and defining each said exposed corrodible surface, and
   (e) said electrodes have a structural configuration such that each electrode maintains an exposed corrodible surface of constant area after a portion of the exposed surface is removed from each electrode during refinishing.

2. A corrosion test probe assembly suitable for determining the rate of corrosion of a metallic material by means of polarization measurement comprising:
   (a) an elongated test body,
   (b) a plurality of spaced-apart tubular electrodes supported in said body, each said electrode having an exposed cylindrical surface at a first radius,
   (c) separate electrically conductive means connected to said electrodes,
   (d) spacer means insulating said electrodes from each other and defining each said exposed cylindrical surface, and
   (e) said electrodes having a cross-sectional configuration within a plane containing the longitudinal axis of said body such that each said electrode has the same cylindrical surface area at a second radius.

3. The probe of claim 2 wherein said electrodes have identical exposed cylindrical surface areas at said first radius.

4. The probe of claim 2 wherein said spacer means have an exposed cylindrical surface at said first radius, and have a cross-sectional configuration within a plane containing the longitudinal axis of said body such that each said spacer means has the same cylindrical surface area at a second radius.

5. The probe of claim 4 wherein said electrodes and said spacer means have identical exposed cylindrical surface areas at said first radius.

6. A corrosion test probe assembly suitable for determining the rate of corrosion of a metallic material by means of polarization measurement comprising:
   (a) an elongated test body,
   (b) a plurality of spaced-apart electrodes supported in said body, each said electrode having an exposed cylindrical surface of a first radius,
   (c) separate electrically conductive means connected to said electrodes,
   (d) spacer means insulating said electrodes from each other and defining each said exposed corrodible surface, and
   (e) said electrodes having surfaces perpendicular to the longitudinal axis of said body such that the product of the radius, and the longitudinal dimension of each electrode at such radius, is a constant for several radii whereby said electrodes have an exposed cylindrical surface of constant area irrespective of the dimension of said several radii.

7. A corrosion test probe assembly suitable for determining the rate of corrosion of a metallic material by means of polarization measurement comprising:
   (a) an elongated test body having a base and an end cap,
   (b) a plurality of spaced-apart annular electrodes, each said electrode having an exposed cylindrical surface of a first radius,
   (c) separate electrically conductive means connected to said electrodes,
   (d) spacer means insulating said electrodes from each other, from said base and from said end cover, said spacer means defining each said exposed cylindrical surface,
   (e) said electrodes having surfaces perpendicular to said longitudinal axis of said body such that the product of the radius, and the longitudinal dimension of each electrode at such radius, is a constant for several radii whereby said electrodes have an exposed cylindrical surface of constant area irrespective of the dimension of said several radii, and
   (f) means to tension said base, end cap, electrodes and spacer means into fluid-tight engagement.

8. The corrosion test probe assembly of claim 7 wherein said electrodes and spacer means have complementary longitudinally extending projections and depressions for aligning and fluidly sealing said electrodes and spacer means to one another.

9. The corrosion test probe assembly of claim 7 wherein each said electrode has a longitudinally extending concentric projection which reaches an apex intermediate the maximum and minimum radii of said electrode, and each said spacer means has a depression to receive the projection on said electrode, said projection and depression providing for aligning and fluidly sealing said electrodes and spacer means to one another.

10. The corrosion test probe assembly of claim 7 wherein each said electrode has arcuate surfaces extending longitudinally, from said first radius through said several radii to concentric nesting surfaces, and said spacer means having complementary arcuate and nesting surfaces, said surfaces providing for aligning and fluidly sealing said electrodes and spacer means to one another.

11. The corrosion test probe assembly of claim 7 wherein said electrically conductive means extend interiorly of said test body, and the exterior surfaces of said electrodes are exposed to corrosion.

12. The corrosion test probe assembly of claim 7 wherein said electrically conductive means extend exteriorly of said test body, and the interior surfaces of said electrodes are exposed to corrosion.

References Cited

UNITED STATES PATENTS

| | | | |
|---|---|---|---|
| 2,545,566 | 3/1951 | Booe | 204—225 |
| 3,098,801 | 7/1963 | Marsh et al. | 204—195 |
| 3,201,685 | 8/1965 | Meyer | 324—30 |
| 3,380,905 | 4/1968 | Clark | 204—195 |

T. TUNG, Primary Examiner

U.S. Cl. X.R.

204—280, 286; 324—29, 71